United States Patent [19]
Katagiri et al.

[11] 3,792,335
[45] Feb. 12, 1974

[54] STEPPING MOTOR CONTROLLED IN RESPONSE TO DATA FROM A TAPE

[75] Inventors: Toshio Katagiri; Tokuji Suga, both of Neyagawa; Shoji Omiya, Shijonawate; Isamu Matsuda, Yao, all of Japan

[73] Assignee: Matsushita Electric Industrial Co., Ltd., Osaka, Japan

[22] Filed: Aug. 1, 1972

[21] Appl. No.: 276,931

[30] Foreign Application Priority Data

| | | |
|---|---|---|
| Aug. 7, 1971 | Japan | 46-59675 |
| Dec. 20, 1971 | Japan | 46-120347 |
| Dec. 24, 1971 | Japan | 47-4372 |
| Dec. 24, 1971 | Japan | 47-4472 |
| Dec. 24, 1971 | Japan | 47-4672 |

[52] U.S. Cl. .... 318/685, 318/696
[51] Int. Cl. .... G05b 19/40
[58] Field of Search .... 313/696, 685, 138, 254, 567

[56] References Cited

UNITED STATES PATENTS

| | | | |
|---|---|---|---|
| 3,660,746 | 5/1972 | Milek | 318/685 |
| 3,636,429 | 1/1972 | Jakubowski | 318/685 |
| 3,374,410 | 3/1968 | Cronquist | 318/685 |
| 3,644,812 | 2/1972 | Bitto | 318/685 |
| 3,217,221 | 11/1965 | Heggen et al. | 318/696 |
| 3,293,522 | 12/1966 | Lewis | 318/327 |

*Primary Examiner*—G. R. Simmons
*Attorney, Agent, or Firm*—Stevens, Davis, Miller & Mosher

[57] ABSTRACT

In a stepping data recorder which employs a stepping motor as a capstan drive motor and in which data is stored on magnetic tape fed stepwise at a rate of several steps per piece of data, the starting and stopping characteristics are improved by appropriately driving the stepping motor so that the magnetic tape moves smoothly.

8 Claims, 8 Drawing Figures

STEPPING MOTOR CONTROLLED IN RESPONSE TO DATA FROM A TAPE

The present invention relates to a step-type or stepping data recorder in which a predetermined length of magnetic tape is intermittently fed when the recording or reproducing of data is performed, and more particularly to a small size data recorder adapted for a Phillips-type cassette.

In order to construct a data recorder adapted for the Phillips-type tape cassette which is very compactly built, the overall size of the recorder should be reduced as small as possible. Otherwise, the merit of compactness of the cassette will become useless. For this reason, there are set limits to, for example, the size of a drive motor, etc. Moreover, in a stepping data recorder in which the magnetic tape is intermittently moved when each piece of data is recorded or reproduced, it is necessary that the driving system of the data recorder quickly reach its steady state when started and immediately be stopped when deenergized, and that the magnetic tape should be prevented from damage ascribable to the sudden start and immediate stop of the tape motion. In order to fulfill the above-mentioned requirements, it is recommendable to use as a capstan drive motor a stepping motor which has a large torque for its small size and which requires a short time in transience from rest to steady state or from steady state to halt, that is, which has a short starting and stopping time, and to run the magnetic tape by means of a pinch roller and a capstan.

Accordingly, it is an object of the present invention to provide a small size data recorder having a drive system including such a stepping motor as described above.

Another object of the present invention is to improve the starting and stopping characteristics of the stepping motor so as to run the magnetic tape smoothly.

A yet further object of the present invention is to provide a data recorder in which the quantity of data recorded per unit length of the magnetic tape can be varied.

An additional object of the present invention is to provide a means to eliminate the hunting phenomenon liable to occur when the stepping motor is stopped.

A further object of the present invention is to provide a means to drive the stepping motor in such a manner that the magnetic tape may be smoothly fed.

For a better understanding of the present invention, reference may be made to the attached drawings, wherein.

Figure 3A:
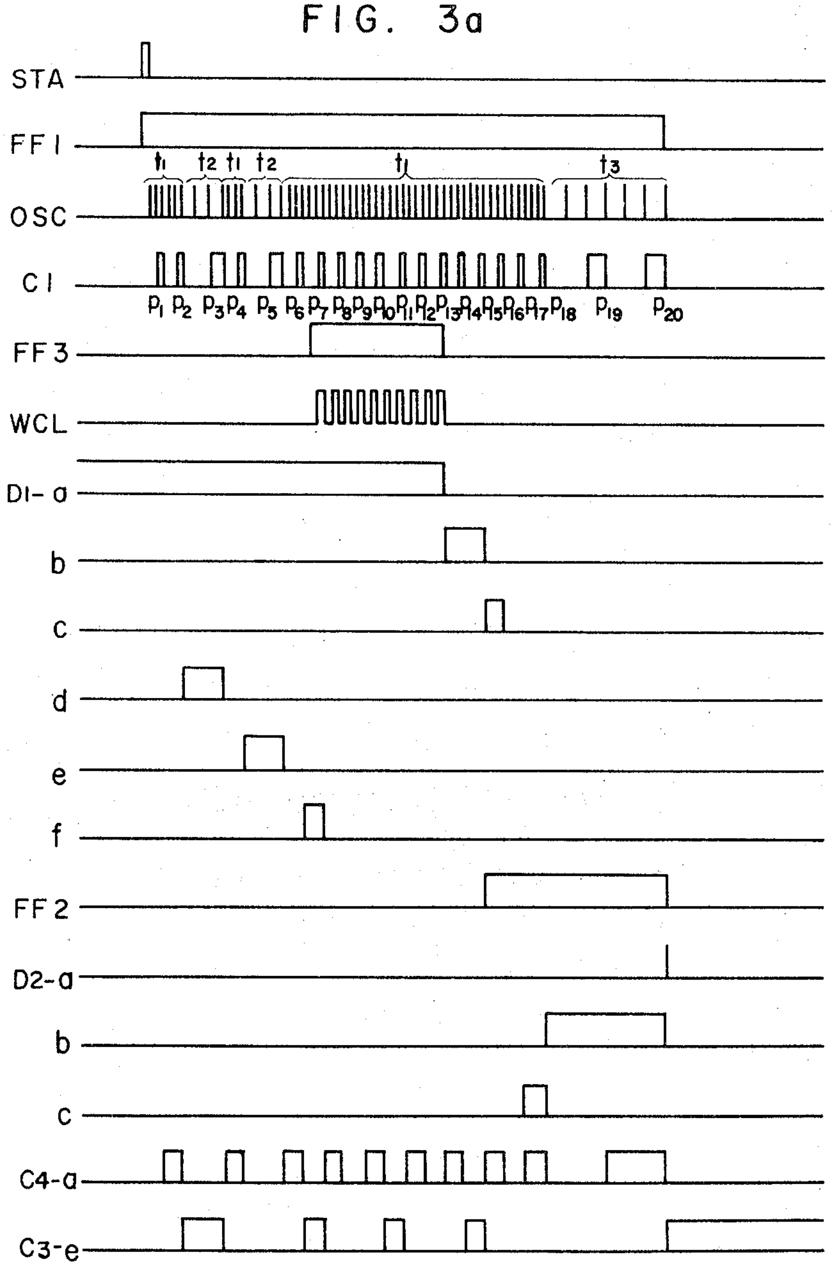
Figure 3B:
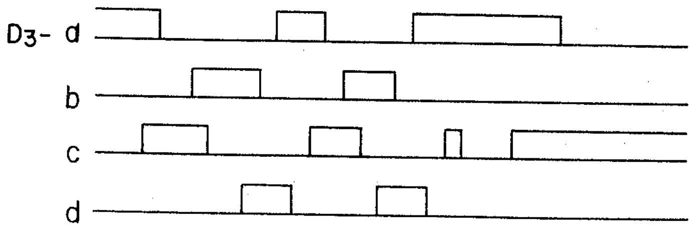
Figure 5:
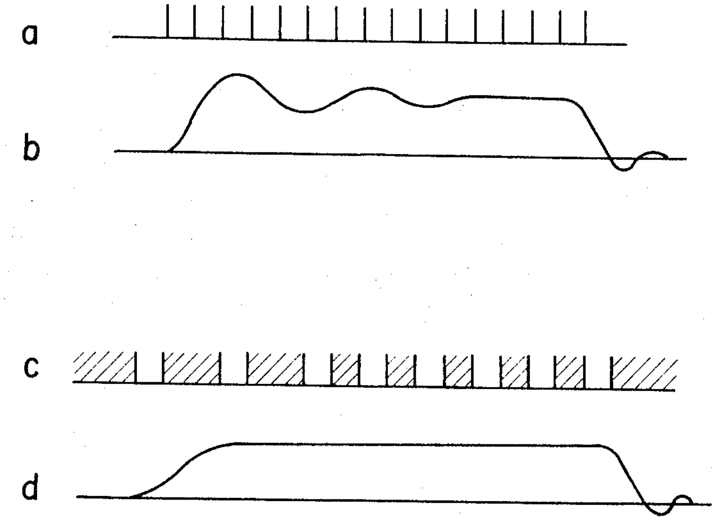
Figure 4:
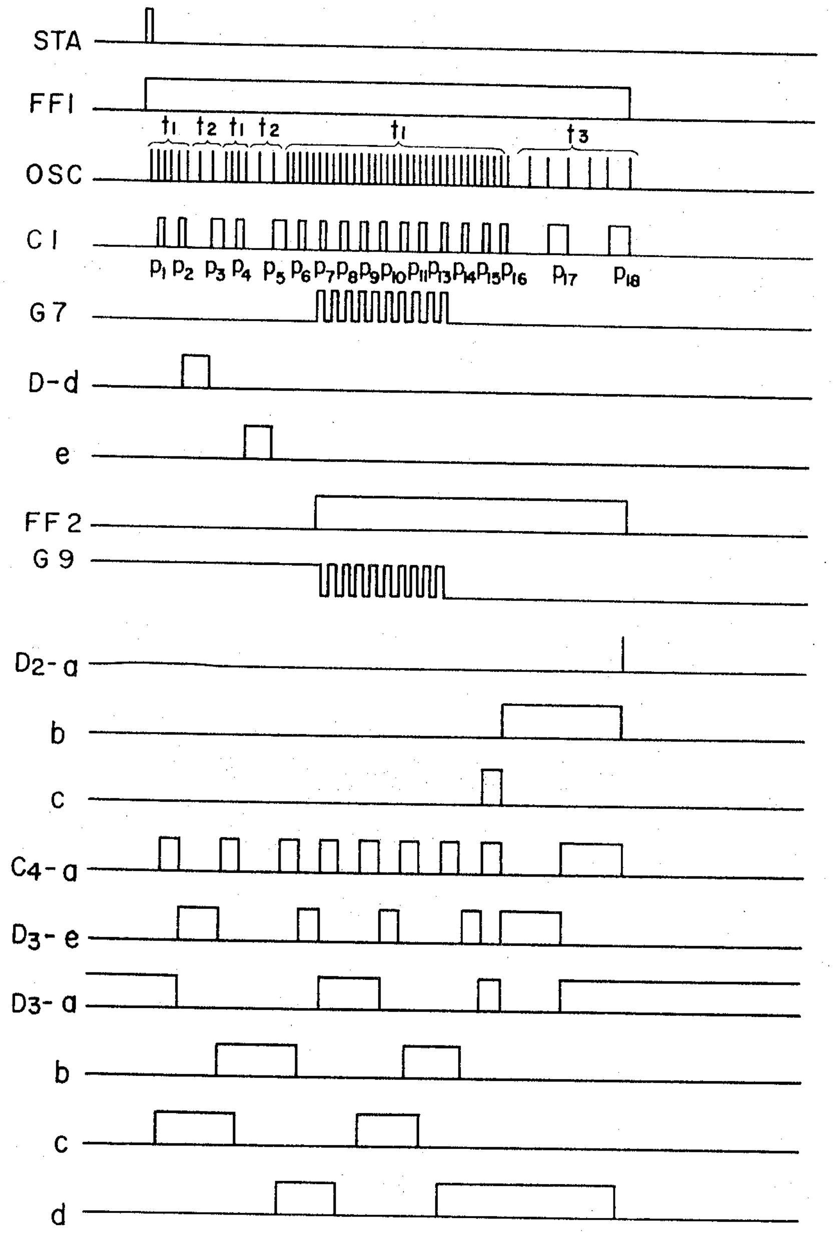
Figure 6A:
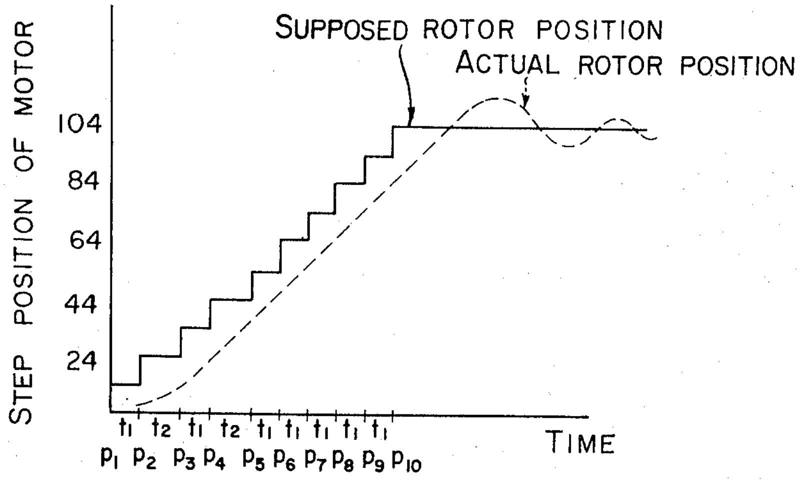
Figure 6B:
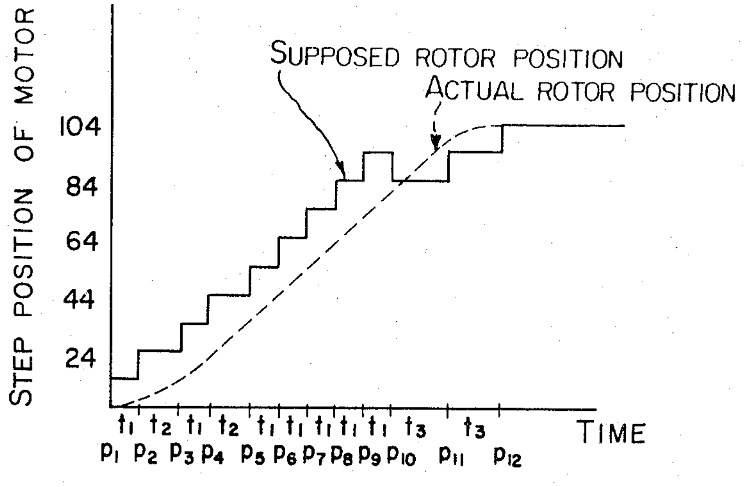

FIG. 3*a* and FIG. 3*b* show signal waveforms necessary for explaining the recording operation;

FIG. 4 shows signal waveforms necessary for explaining reproduction operation;

FIG. 5 shows signal waveforms necessary for explaining the starting characteristic of the stepping motor; and FIGS. 6*a* and 6*b* show signal waveforms necessary for explaining the stopping characteristics of the stepping motor.

Figure 1:
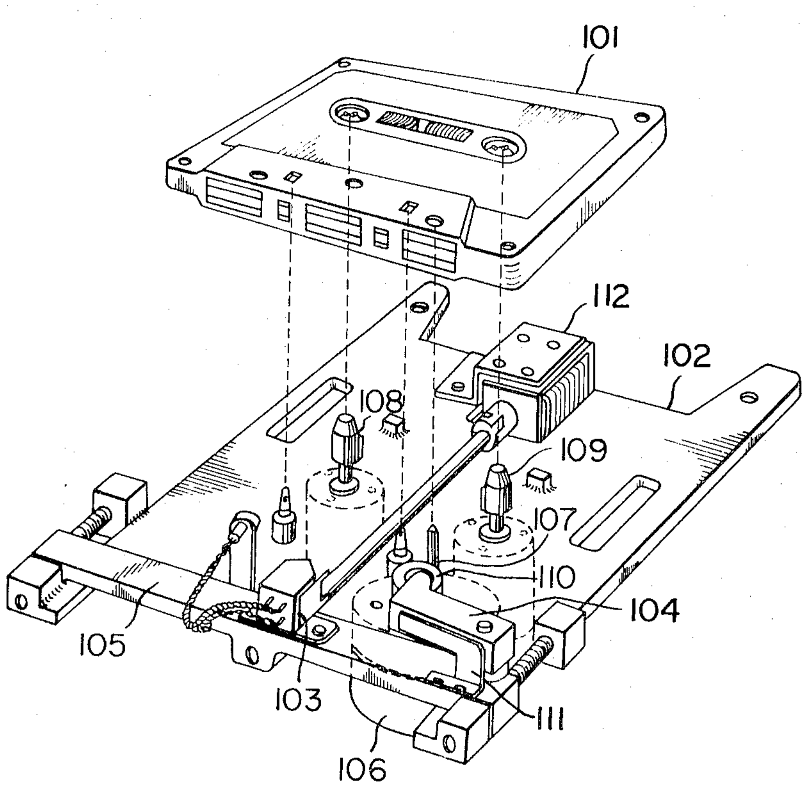
FIG. 1 is a perspective view of the mechanical construction of a data recorder embodying the present invention.

Referring now to FIG. 1, there are shown the essential parts of a data recorder embodying the present invention, comprising a cassette 101 housing therein magnetic tape, a base plate 102, a magnetic head 103 for recording and reproducing, an arm 104 carrying a pinch roller 110 and urged in one direction by means of a spring 111, a slidable carrier 105 on which the arm 104 and the magnetic head 103 are mounted, an electromagnet 112 for shifting the carrier 105, a stepping motor 106 the shaft of which is coaxial with a capstan 107 and which, in this case, is a so-called two-phase stepping motor consisting of a pair of unit motors (other forms of stepping motors may be used), and reel motors 108 and 109 each of which is an ordinary dc motor. The following explanation will be made under such a condition that the cassette 101 is set on the base plate 102, the electromagnet 112 being excited so that the magnetic head 103 and the pinch roller 110 may be pressed against the magnetic tape in the cassette 101.

Figure 2:
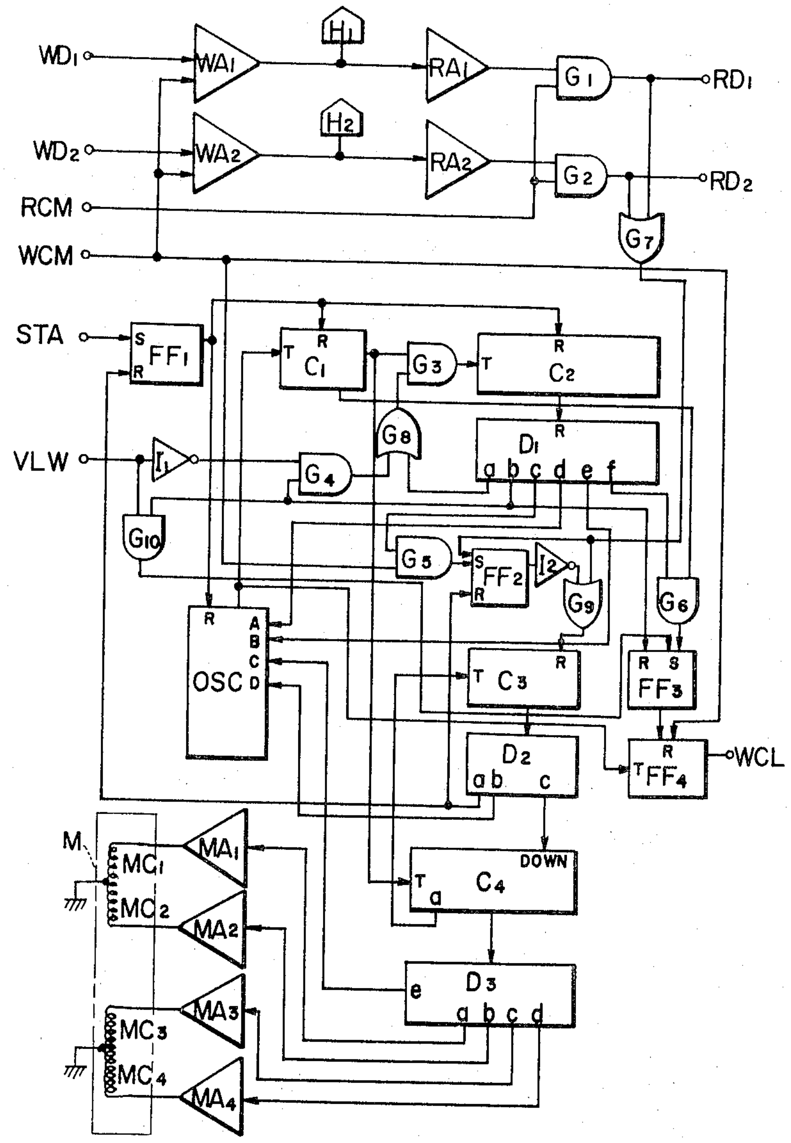
FIG. 2 is an electrical block diagram of the data recorder shown in FIG. 1.

In FIG. 2, terminals $WD_1$ and $WD_2$ receive signals respectively for tracks 1 and 2, i.e., channels 1 and 2, in the magnetic tape. Reference characters $WA_1$ and $WA_2$ designate recording amplifiers; $H_1$ and $H_2$ recording and reproducing heads; $RA_1$ and $RA_2$ reproducing amplifiers; $G_1$ and $G_2$ reproducing output gates which are controlled by an input applied to a read command input terminal RCM; WCM a write command input terminal to receive a signal which operates the recording amplifiers $WA_1$ and $WA_2$; $RD_1$ and $RD_2$ read signal output terminals; STA an input terminal which receives a starting signal for starting the data recording device; VLW an input terminal for a signal to control the data length which will be later described; WCL an output terminal for a write clock signal; $FF_1$–$FF_4$ flips-flops; $C_1$ a scale-of-three counter; $C_2$ a 4-bit binary counter; $C_3$ a 2-bit binary counter; $C_4$ a 3-bit up-down counter; $D_1$, $D_2$ and $D_3$ decoders connected respectively with the counters $C_2$, $C_3$ and $C_4$, the decoder $D_3$ being so designed as to drive the motor M in a one- or two-phase mode; $G_1$ to $G_6$ and $G_{10}$ AND gates, $G_7$ to $G_9$ OR gates; $I_1$ and $I_2$ inverters; OSC an oscillator circuit whose oscillation frequency varies in response to the signals received at input terminals A to D, that is, which is so designed that a decoder provided therein change over the resistors connected with the emitter of a unijunction transistor; and $MA_1$ to $MA_4$ driving amplifiers connected respectively with the coils $MC_1$ to $MC_4$ of the two unit motors of the stepping motor M.

The operation of the circuit shown in FIG. 2 is as follows.

RECORDING OPERATION

Reference should be made to FIGS. 3*a* and 3*b*. When a starting pulse is applied to the terminal STA, the flip-flop $FF_1$ is set. Accordingly, the counters $C_1$ and $C_2$ are released from their reset states and the oscillator OSC begins to oscillate at a period of $t_1$. The output of the oscillator OSC is frequency-divided by means of the counter $C_1$ (see diagram $C_1$ of FIG. 3*a*) and then fed to the counters $C_2$ and $C_4$. The counter $C_4$ counts the input pulses. The output of the decoder $D_3$ varies in response to the counted value so that a pulse signal to be applied to the motor M is generated to rotate the motor M. When the counter $C_2$ counts two pulses from the counter $C_1$, at the terminal *d* of the decoder $D_1$ appears an indication signal to indicate such a condition that two pulses have been counted. At the terminal *e* of the decorder $D_3$ appears a signal when current is drawn only through the coils $MC_1$ and $MC_2$ of the motor M operating in a 1–2 phase drive mode, i.e., in a single phase condition where only one of the unit motors is energized. The signals are applied to the oscillator OSC, the oscillating period of which is increased to be $t_2$. When the counter $C_2$ counts four pulses, an output is delivered from the terminal *e* of the decoder $D_1$ while at this time no output is delivered from the terminal *e* of the decoder $D_3$. Accordingly, the oscillator OSC resumes oscillation at a period $t_2$ in response to the combination of the outputs. If an output appears after the second pulse but does not after the fourth pulse at the terminal *e* of the decoder $D_3$, the oscillation period of the oscillator OSC becomes $t_2'$ which differs from $t_2$. The details of the foregoing will be described later. If the counter $C_2$ counts six pulses, an output appears at the terminal *f* of the decoder $D_1$. This output together with an output from the scale-of-three counter $C_1$ opens the gate $G_6$ so that the flip-flop $FF_3$ is set to release the flip-flop $FF_4$ from its reset state.

The flip-flop $FF_4$ released from its reset state delivers a recording clock signal obtained by frequency-dividing the pulses from the oscillator OSC at the terminal WCL. The recording of data onto the magnetic tape is performed in timing with this clock signal. Moreover, the clock signal is synchronized with the output of the oscillator OSC, i.e., the stepping period of the stepping motor M, and the point of time when the clock signal is first delivered at the terminal WCL comes after a predetermined number of steps after the stepping motor M has started rotating so that even if there is a variation in the oscillation period of the oscillator OSC, the relative positions of signals to one another recorded on the magnetic tape remains invariable. When the counter $C_2$ has counted thirteen pulses, the decoder $D_1$ delivers no output at the terminal *a* but an output at the terminal *b*. Although the gate $G_3$ has been so far opened by the output from the terminal *a* of the decoder $D_1$ to pass the output of the counter $C_1$ over to the counter $C_2$, the gate $G_3$ is now held open by the output *b* of the decoder $D_1$. If there is no input to the terminal VLW at this time, the gates $G_3$ and $G_4$ are opened and the flip-flop $FF_3$ is reset so that only 10 of the write clock pulses (corresponding to one character) are delivered and no more. If, on the other hand, there is an input to the terminal VLW, none of gates $G_4$ and $G_3$ are opened so that no pulse is sent to the counter $C_2$. At the same time, the gate $G_{10}$ is opened so that the flip-flop $FF_3$ is set and the write clock pulses are continuously delivered. Accordingly, the data length of one character may consist of as many bits as desired, e.g. more than 10 bits. This is very advantageous in that the data recorder under consideration can be connected with, for example, a minicomputor (in which one word consists of 16 bits). If the signal applied to the terminal WLC is interrupted after a desired number of write clock pulses are obtained, the operation of the circuit will be the same as the normal one.

When the write clock signal ceases to be delivered and the counter $C_2$ has counted fifteen pulses, no output appears at the terminal *b* of the decoder $D_1$ and the gate $G_3$ is closed so that the counter $C_2$ stops counting. An output appears at the terminal *c* of the decoder $D_1$ and the output is fed through the gate $G_5$ to the flip-flop $FF_2$ to drive it into the set state. Consequently, the counter $C_3$ is released from its reset state and begins to count. Output pulses from the first stage of the counter $C_4$ are applied to the input of the counter $C_3$, and when the second pulse of the output pulses is received by the counter $C_3$, an output appears at the terminal *c* of the decoder $D_2$. This is applied to the terminal DOWN of the counter so that the counter $C_4$ may count in the reverse direction only while the output continues to appear at the terminal *c* of the decoder $D_2$. Therefore, the state of excitation of the motor M at the instant of the eighteenth pulse is the same as at the instant of the sixteenth pulse. When the counter $D_3$ finishes counting the second pulse, the output at the terminal *c* of the decoder $D_3$ disappears while an output appears at the terminal *b* of the decoder $D_2$. Consequently, the oscillation period of the oscillator OSC becomes longer. The effect of the above described steps of operation will be described later. When the counter $C_3$ finishes counting the third pulse, the output at the terminal *b* of the decoder $D_2$ disappears while an output appears at the terminal *a* of the decoder $D_2$. Accordingly, the flip-flops $FF_1$ and $FF_2$ are both reset and the counters $C_1$, $C_2$ and $C_3$ are all reset so that the recording of one word is completed and the circuit restored its initial state. The output at the terminal *a* of the counter $C_4$, i.e., the input pulses to the counter $C_3$, is the output of the first stage of the counter $C_4$, as described above, and serves to determine whether the 1–2 phase motor M is driven in the single phase mode or in the two-phase mode. In this embodiment, the circuit is so designed as to produce pulses when the motor M is in the two-phase mode. Therefore, if the motor is stopped when the counter $C_3$ has counted a full count, the motor will stop always in the single phase mode.

REPRODUCING OPERATION

Since no signal is applied to the write command input terminal WCM during the reproduction operation, the gate $G_5$ and the flip-flop $FF_4$ are always deenergized while the gates $G_1$ and $G_2$ are opened and the signal stored on the magnetic tape is read out since a signal is in turn applied to the read command input terminal.

Reference should be made to FIG. 4. A starting signal, which is similar to that mentioned in the recording operation above, is applied to the terminal STA to set the flip-flop $FF_1$ so that the oscillator OSC begins to oscillate at a period of $t_1$. Some following steps of this operation are the same as in the recording operation until the counter $C_2$ has counted six pulses from the counter $C_1$.

If the information stored in on the magnetic tape starts to be reproduced by means of the magnetic head when the seventh pulse is delivered from the counter $C_1$, as seen in FIG. 4, then the reproduced signal is applied not only to the output terminals $RD_1$ and $RD_2$ but also to the flip-flop $FF_2$ through the gate $G_7$. Accordingly, the flip-flop $FF_2$ is set to release the reset state of the counter $C_3$. However, since the counter $C_3$ is reset also by the reproduced signal itself through the gate $G_9$, the counter $C_3$ remains reset so long as the reproduced signal lasts. When the reproduced signal ceases, the counter $C_3$ starts its continuous counting operation. The counter $C_3$ counts the pulses from the terminal *a* of the counter $C_4$, and after it has counted the second pulse it causes the decoder $D_2$ to deliver at its terminal $c$ a signal to make the counter $C_4$ count inversely. After the counter $C_3$ has counted the third pulse, a reset pulse is applied from the terminal $a$ of the decoder $D_2$ to the flip-flop $FF_1$ so that the reading of one word is completed. These steps of operation are the same as in those of the recording operation. Therefore, the stop position of the motor in the reproducing operation is always in advance of that in the recording operation, that is, closer to the data which has already been read. This prevents the stop position in the reproducing operation from coming after that in the recording operation and therefore a portion of the following data stored on the magnetic tape from being skipped.

Moreover, even if the reproduced signal is delivered only after not seven but 10 or more pulses have been delivered from the counter $C_1$, no inconvenience will arise since the counter $C_1$ remains still after it counts fifteen pulses while the counter $C_3$ does not start operating before it receives the reproduced signal.

Now, the effect of changing the period of oscillation in timing with the second and fourth pulses, will be described.

Normally, when a stepping motor is driven by a pulse signal having a constant period, as shown in the graph $a$ of FIG. 5, there is caused an overshoot in the starting transient of the stepping motor as shown in the curve $b$ of FIG. 5. Therefore, the method of driving the stepping motor by a constant pulse signal is not suitable for the case where the smooth running of the magnetic tape is of the first importance. If the pulse interval during the starting transient is made longer than the standard period, as shown in the diagram $c$ of FIG. 5, the motor exhibits a smooth starting as shown in the curve $d$ of FIG. 5. Driving torque is larger in two-phase energization than in the single phase one. The speed of the motor will fall if the time in the single phase mode is made longer while the speed will rise if the time in the two-phase drive is made longer. Therefore, the speed can be controlled only by controlling the pulse duration in one of the two driving modes, i.e., single-phase drive time and two-phase drive time. In this case, since it is necessary to prevent the overshoot phenomenon, the one-phase period should be made longer. As described above, the motor stops in the one-phase mode and the one-phase period comes after the second and fourth pulses, as seen in the diagram $c$ of FIG. 5. Accordingly, a smooth rotation of the motor can be obtained by lengthening the one-phase time after the second and fourth pulses. Also, the control of the rotational speed can be facilitated.

A stepping motor generally consists of a plurality of unit motors connected together with one unit motor shifted by a certain constant angle from another. It is inevitable that the shift angles between unit motors are not uniform due to the limitation in accuracy in machining and assembling. Such non-uniformity in the shift angles causes the unevenness in torque during the starting transient. Therefore, the motor can be more smoothly started by changing the one-phase drive period $t_2$ for respective unit motors. In this case, the one-phase period $t_2$ may be changed depending upon which one of the unit motors constituting the stepping motor is first driven. In practice, the time $t_2$ is changed by determing which one of the unit motors is powered in timing with the second and fourth pulses, on the basis of the output at the terminal $d$ of the decoder $D_1$ and at the terminal $e$ of the decoder $D_3$, since the stepping motor stops in the one-phase mode as described above.

Next, the stopping of the stepping motor will be described. The hunting phenomenon caused when the motor is stopped, greatly affects the recording and reproducing speed of a stepping data recorder. FIG. 6$a$ shows a conventional driving method, in which stepping pulses are applied to the motor at each of instants $p_1$ to $p_{10}$, $t_1$ being a step period of normal motor rotation and $t_2$ a period made longer than $t_1$ so as to smoothly start the motor. As the instants $p_1$ to $p_{10}$ are sequentially reached, the step position of the motor, i.e., the angular position of the rotor at those points of time, increases stepwise by a constant angle $\phi$. The staircase solid curve represents the supposed step positions of the motor with respect to the stepping pulses. In practice, however, the rotor is not free from retardation in rotation due to the inertia thereof and the load connected therewith and this state is manifested by the dashed curve on the same coordinate system. If the group of pulses at the instants $p_1$ to $p_{10}$ end with the period $t_1$, the rotor having some rotational retardation still continues to rotate at a constant speed for some time. Only after the rotor position exceeds 10 $\phi$, does the braking force begin to be applied. Consequently, a large hunting will be caused. FIG. 6$b$ shows the method of driving the stepping motor according to the present invention. According to this method, the step position is decreased by $\phi$ at or near the instant $p_{10}$ (corresponding to the eighteenth pulse in the recording operation). At or near the instant $p_{10}$, the rotor position almost coincides with the supposed step position of the motor and a braking force is then applied to the rotor. Thereafter, the rotor is subjected to a gradual braking force due to a pulse generated after an interval $t_3$ longer than $t_1$ so that no hunting will be caused. As a result, the time from start to stop is shortened and this a great improvement in the operating characteristic of a stepping motor.

What we claim is:

1. A stepping data recorder comprising a stepping motor for driving a capstan;

a means for rotating said stepping motor continuously through a plurality of steps;

a means for recording a predetermined length of data on magnetic tape, the speed of said tape being controlled by said capstan during the continuous rotation of said stepping motor, in timing with each of said plurality of steps;

a means for generating a signal when there is stored any data on a portion of said magnetic tape during a reproduction operation;

a means for detecting the non-existence of said signal at least during a period longer than one of said plurality of steps; and a means for stopping said continuous rotation of said stepping motor through said plurality of steps in response to the output of said detecting means during the reproduction operation.

2. A stepping data recorder according to claim 1, wherein said means for rotating said stepping motor comprises an oscillator circuit which starts oscillating in response to a starting signal and a driving circuit for generating a signal to be applied to the driving coils of said stepping motor by receiving an output from said oscillator circuit.

3. A stepping data recorder according to claim 2, wherein said stepping motor comprises a plurality of unit motors having a common rotor shaft, said oscillator circuit being so designed that its oscillation period may be varied by a control signal applied externally and wherein there is provided a means for determining which one of said plural unit motors is first started when said stepping motor as a whole is actuated and a means for varying said oscillation period of said oscillator circuit, so that the overshoot or overdamping of said stepping motor, due to the difference in torques of said unit motors at the time of starting, may be prevented.

4. A stepping data recorder according to claim 1, wherein said recording means comprises a counter which counts the steps through which said stepping motor is rotated and delivers an output when it has counted a predetermined number of steps per a piece of data, a means for stopping the continuous rotation of said stepping motor in response to said output of said counter, and a means for keeping the continuous rotation of said stepping motor in response to a data length control signal applied externally, during an arbitrary duration of time irrespective of said output of said counter, so that a constant quantity of data is normally stored while the length of data to be recorded is changed by the application of an external control signal.

5. A stepping data recorder according to claim 1, wherein said means for continuously rotating said stepping motor is a pulse generating circuit for generating a group of pulses whose pulse interval is so determined that the rotor may be continuously rotated and wherein there is further provided a means for advancing the excitation of said stepping motor by one step in the direction inverse to the rotation thereof in response to a pulse near the last one of said group of pulses, so that hunting may be prevented by correcting the retardation in the rotor position.

6. A stepping data recorder according to claim 5, wherein said pulse generating circuit comprises an oscillator circuit which starts operating when it receives a starting signal, an up-down counter for counting the output of said oscillator circuit, a decoder for receiving the output of said up-down counter and generating a group of pulses to be applied to said stepping motor, and a means for causing said up-down counter to count only one pulse subtractively at a point of time near the epoch of the last pulse of said group.

7. A stepping data recorder according to claim 6, wherein said oscillator circuit is an oscillator whose oscillation period can be changed by a control signal externally applied and wherein there is further provided a counter for counting the output of said oscillator, so that said stepping motor may be smoothly rotated by applying different signals to said oscillator, in order to control said oscillation period, respectively during the times of starting acceleration, constant rotation and the stopping deceleration of said stepping motor according to the outputs derived from said counter when it counts a predetermined number of pulses.

8. A stepping data recorder according to claim 2, wherein said oscillator circuit has its oscillation period variable in response to a control signal and said driving circuit generates pulses to drive said stepping motor in the one- or two-phase mode and wherein there is further provided a means for adjusting the duration of the one-phase mode by applying a control signal to said oscillator circuit during the starting transient of said stepping motor, so that said stepping motor may start rotating smoothly.

* * * * *